United States Patent
Báder (10) Patent No.: US 9,386,589 B2
(45) Date of Patent: Jul. 5, 2016

(54) RESOURCE MANAGING METHOD, RESOURCE MANAGEMENT DEVICE AND APPARATUS FOR SUPPORTING OPERATION OF A RADIO COMMUNICATION NETWORK

(75) Inventor: Attila Báder, Paty (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 214 days.

(21) Appl. No.: 13/984,693

(22) PCT Filed: Mar. 4, 2011

(86) PCT No.: PCT/EP2011/053293
§ 371 (c)(1),
(2), (4) Date: Aug. 9, 2013

(87) PCT Pub. No.: WO2012/119635
PCT Pub. Date: Sep. 13, 2012

(65) Prior Publication Data
US 2013/0316722 A1    Nov. 28, 2013

(51) Int. Cl.
*H04W 72/00* (2009.01)
*H04W 72/04* (2009.01)
*H04W 4/18* (2009.01)
*H04W 88/18* (2009.01)

(52) U.S. Cl.
CPC ............ *H04W 72/0486* (2013.01); *H04W 4/18* (2013.01); *H04W 88/18* (2013.01)

(58) Field of Classification Search
CPC .......................... H04W 88/18; H04W 72/0486
See application file for complete search history.

(56) References Cited

U.S. PATENT DOCUMENTS

| | | | |
|---|---|---|---|
| 2003/0027571 A1* | 2/2003 | Karlsson et al. | 455/433 |
| 2007/0142031 A1* | 6/2007 | Lee et al. | 455/411 |
| 2008/0101311 A1* | 5/2008 | Bernhard et al. | 370/342 |
| 2009/0111400 A1* | 4/2009 | Kazmi et al. | 455/127.1 |
| 2009/0228742 A1* | 9/2009 | Lewallen | 714/47 |
| 2010/0216468 A1* | 8/2010 | Kazmi | H04W 48/20 455/435.3 |
| 2010/0311435 A1* | 12/2010 | Mueck et al. | 455/453 |
| 2011/0032820 A1* | 2/2011 | Finlay | 370/230 |

FOREIGN PATENT DOCUMENTS

| | | |
|---|---|---|
| WO | 0067507 A1 | 11/2000 |
| WO | 2010134856 A1 | 11/2010 |

* cited by examiner

*Primary Examiner* — Khalid Shaheed
(74) *Attorney, Agent, or Firm* — Coats & Bennett, PLLC (57) ABSTRACT

The present invention relates to a method to be carried out by a network support apparatus for managing resources of the apparatus, a method for managing resources of a network node, an apparatus for supporting the operation of a network and a resource management device, which particularly enable the determination of load at the apparatus or network node to allow more resource efficient scheduling of PM functions. The method carried out by the network support apparatus for managing resources comprises determining a load at the network support apparatus based on the number of events generated by recordings activated by at least one performance management function in a time period; comparing the determined load with a threshold load smaller than or equal to the maximum load supported by the network support apparatus; and performing a resource management procedure according to the result of the comparing step.

23 Claims, 5 Drawing Sheets

| Monday<br>Zone 0 Time | 7:00 | 8:00 | 9:00 | 10:00 | 11:00 | 12:00 | 13:00 | 14:00 | 15:00 | 16:00 | 17:00 | 18:00 | 19:00 | 20:00 | 21:00 | 22:00 | 23:00 | 0:00 |
|---|---|---|---|---|---|---|---|---|---|---|---|---|---|---|---|---|---|---|
| | | Morning | | | | | | Afternoon | | | | | | | Evening | | | |
| Time Zone 0 | | | Rec 1 | | | Rec 2 | Rec 1<br>Rec 11<br>Rec 23 | Rec 1<br>Rec 11<br>Rec 23 | Rec 1<br>Rec 11<br>Rec 23 | Rec 2 | | Rec 2 | Reserved for<br>TR shooting | | | | Rec 1 | |
| | | Morning | | | | | | Afternoon | | | | | | | Evening | | | |
| Time Zone +1 | Rec 1 | | | | Rec 2 | | | | | Rec 2 | | | | | | | Rec 1 | |
| Time Zone +2 | Rec 1 | | | | Rec 2 | | | | Rec 2 | | Rec 2 | | | | | Rec 1 | | |

Fig. 8

RESOURCE MANAGING METHOD, RESOURCE MANAGEMENT DEVICE AND APPARATUS FOR SUPPORTING OPERATION OF A RADIO COMMUNICATION NETWORK

FIELD OF THE INVENTION

The present invention relates to a method to be carried out by a network support apparatus for managing resources of the apparatus, a method for managing resources of a network node, an apparatus for supporting the operation of a network and a resource management device, which particularly enable the determination of load at the apparatus or network node, respectively.

TECHNOLOGICAL BACKGROUND

With the deployment of Long Term Evolution (LTE) the number of different radio access networks used side by side is further increasing. Thereby, it is a challenge to monitor, trouble-shoot and optimize not only one individual network but also the combination of networks, since a mobile user may change the cell or even the network during a single session.

Currently, Performance Management (PM) functions of radio access networks are used for monitoring, trouble-shooting and optimizing of networks. Monitoring is needed to detect and prevent any degradation or fault during the operation. Trouble-shooting functions aid to find the cause of an error in the complex system. Optimization functions are used to improve network quality and improve the utilization of the network resources.

Several PM functions trigger radio measurements which can be implemented for mobile stations and base stations. The primary goal of these measurements is to facilitate the mobility between cells, e.g. to allow handover within cells of the same radio network or between cells of different radio networks. For example, measurements are triggered by PM functions, wherein downlink measurements are performed by mobile equipment, such as mobile stations, and uplink measurements are performed by base stations.

Some PM functions also use and activate periodic radio measurements, the result of which is recorded as a recording and provided to a network node or support apparatus. For example, PM functions activate the measurement of radio parameters of specific frequency channels or channel codes or scan the frequency spectra or code range. The recordings are classified in recording types. Examples of such recording types are BCCH Allocation Recording (BAR) and the Radio Interference Recording (RIR) functions in GSM, or Radio Environment Statistics (RES) measurements in Wireless Regional Area Networks (WRAN). PM functions for LTE radio measurements are under specification in 3GPP TS 36.214.

The measurement data may be collected in statistical counters or reported in PM events. The counters and events generated by the recordings can be collected in files for a Result Output Period (ROP) in a network node, such as Base Station Controller (BSC) (in GSM network), Radio Network Controller (RNC) (in WCDMA network), or eNodeB (in LTE network). ROP files may then be sent after the ROP periodically to Operating Support System (OSS) or another network management node. It is also possible to use streaming interfaces to provide the network management node with PM events. The counters and events can then be processed in the network management node. Events, which are generated by recordings of measurement data activated by a PM function, can highly load network nodes, such as a base station or BSC, and an OSS.

A PM function may include the functionality of the OSS side, constituting an application at the OSS side, and a recording function in the node. The recording function in the node includes the measurement function and collecting/saving the measurement data by carrying out a recording. The data is then analyzed by the PM function.

Currently, executions of PM functions and thus data measurements and their recordings are scheduled manually based on the experience of Radio Network Optimization (RNO) engineers and there is no adequate procedure for planning the recordings and ensure the required resources in the nodes for the execution of PM functions. Further, there is currently no tool to estimate the load at a network node generated by PM functions and to compare the load to characteristics measured at the network node side, such as the OSS side to determine the capability in coping with scheduled PM functions at the network node.

Different RNO functions, a subset of PM functions, share common recording functions of GSM, WRAN and LTE networks. It is a general limitation of a radio network system that parallel recordings using the same PM functions with possibly different parameters cannot be performed for overlapping selected cell sets so that the recordings have to be scheduled, e.g. manually by an RNO engineer. Additionally, functions that activate periodic measurements generate high load on the network as well so that the number of selected cell sets and the number of possible parallel recordings is limited.

On the one hand, it is desirable for operators to obtain as much information about the network as possible, and thus to run PM functions continuously to obtain measurement data for the whole network and for different time periods. However, on the other hand, it has to be ensured that network nodes and particularly the OSS server are not overloaded. Manually scheduled recordings by an RNO engineer are often insufficient to optimally meet these requirements and may lead to inadequate recordings, insufficient data and server and/or network overload.

These problems are even more severe in large networks, in which the network management is divided into multiple OSSs which may be segmented based on time zones. Accordingly, such segmentation may lead to high loads on each OSS server in busy business hours and low load at night where only a small part of the OSS server capacity is used.

DISCLOSURE OF INVENTION

The present invention is thus directed at solving at least some of the above problems and provides methods for managing resources of a network support apparatus and network node, respectively, as well as an apparatus for supporting the operation of a network, a resource management device, a computer program and computer readable medium as defined in the independent claims. Advantageous embodiments are described in the dependent claims.

According to one embodiment of the present invention, a method is proposed which is carried out by a network support apparatus of a radio communication network for managing resources of the network support apparatus. The method comprises the step of determining a load at the network support apparatus based on the number of events generated by recordings activated by at least one performance management function in a time period. The method comprises the further steps of comparing the determined load with a threshold load smaller than or equal to the maximum load supported by the network support apparatus and performing a resource management procedure according to the result of the comparing step. Accordingly, a good estimation of the load at a network support apparatus is obtained to help operators to use PM functions in an optimal way. In particular, operators can plan and schedule monitoring, trouble-shooting and optimization functions of a radio network without overloading a network support apparatus, such as an OSS server, and the load can be automatically balanced.

According to another embodiment, a method is provided for managing resources of a network node of a radio communication network. The method comprises the step of determining a load of the network node based on traffic at the network node and a predetermined parameter associated with a network node type and a recording type of a recording activated by a performance management function. The method further comprise the steps of comparing the determined load with a threshold load smaller than or equal to the maximum load supported by the network node and performing a resource management procedure according to the result of the comparing step. Accordingly, a good estimation of the load is obtained which may help the operator to use PM functions in an optimal way. In particular, the operator may plan and schedule monitoring, trouble-shooting and optimization functions of the radio network in an optimal way without overloading a single or multiple network nodes so that the load of the network can be balanced.

According to another embodiment, an apparatus for supporting the operation of a radio communication network is provided. The apparatus comprises a determination section configured to determine a load at the apparatus based on the number of events generated by recordings activated by at least one performance management function in a time period. The apparatus further comprises a comparator configured to compare the determined load with a threshold load smaller than or equal to the maximum load supported by the apparatus, wherein the apparatus is configured to perform a resource management procedure according to the result obtained by the comparator. Accordingly, a good estimation of the load is obtained to help operators to use PM functions in an optimal way. In particular, operators can plan and schedule monitoring, trouble-shooting and optimization functions of a radio network without overloading a network support apparatus, such as an OSS server, and the load can be automatically balanced.

According to another embodiment, a resource management device of a network node of a radio communication network is provided. The resource management device comprises a determination section configured to determine a load of the network node based on traffic at the network node and a predetermined parameter associated with a network node type and a recording type of a recording activated by a performance management function. The resource management device further comprises a comparator configured to compare the determined load with a threshold load smaller than or equal to the maximum load supported by the network node, wherein the resource management device is configured to perform a resource management procedure according to the result obtained by the comparator. Accordingly, a good estimation of the load is obtained which may help the operator to use PM functions in an optimal way. In particular, the operator may plan and schedule monitoring, trouble-shooting and optimization functions of the radio network in an optimal way without overloading a single or multiple network nodes so that the load of the network can be balanced.

According to another embodiment, a computer program may be provided including instructions adapted to cause data processing means to carry out one of the above described methods.

According to another embodiment, a computer readable medium may be provided, in which a program is to make a computer execute one of the above described methods.

Further advantageous features of the invention are disclosed in the dependent claims.

DESCRIPTION OF THE EMBODIMENTS

The further embodiments of the invention are described with reference to the figures. It is noted that the following description contains examples only and should not be construed as limiting the invention.

In the following, similar or same reference signs indicate similar or same elements or operations.

Figure 1:
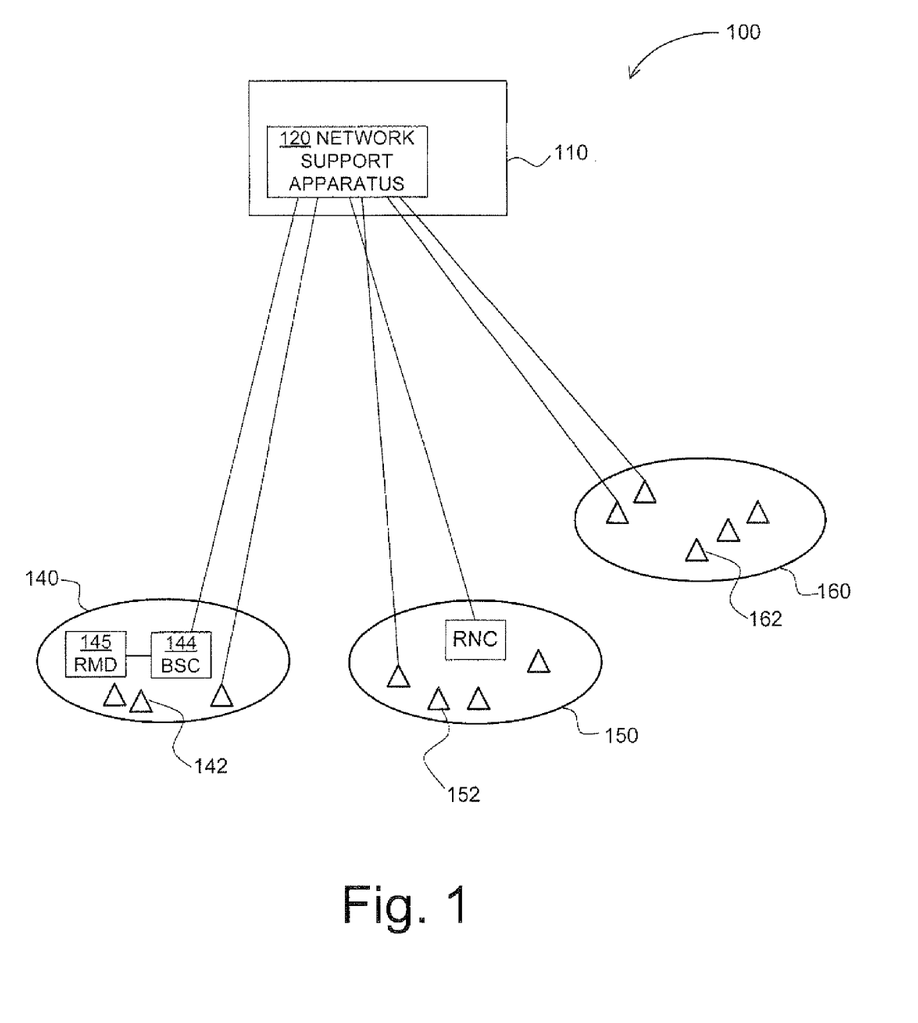
FIG. 1 illustrates a radio network system of different radio access networks according to an embodiment of the invention.

FIG. 1 illustrates a radio network system 100 according to an embodiment of the invention as well as elements thereof. A radio network system is commonly used to enable mobile communication between mobile stations, such as mobile phones, or communication from a mobile station to a fixed line phone or data server by communicating with a radio access network via a node, such as a base station.

The radio network system 100 comprises an Operating Support System (OSS) 110 with a network support apparatus 120. The OSS 110 is connected, in this example, to three radio access networks, a GSM network 140, a Wide-Band Code Division Multiple Access (WCDMA) network 150 and a LTE network 160. The OSS has several radio network optimization (RNO) functions which are specific Performance Management (PM) functions associated with different recording functions for radio measurements. In detail, a measurement is activated by a PM function and a recording is made of the resulting data which data is then analyzed by the PM function of the OSS received thereat as files or events, e.g. streaming events.

As can be seen from FIG. 1 the OSS 110, and in particular the network support apparatus 120 of the OSS 110, interfaces to different radio network nodes, wherein node is not limited to the network nodes shown by triangles in FIG. 1, such as base station 142, node 152 of the WCDMA 150 or node B 162, but may also include a controller of the different networks, such as the Base Station Controller (BSC) 144 or Radio Network Controller (RNC). Although the network support apparatus 120 could also be considered a network node, it will be referred to in the following to network support apparatus 120 when this apparatus is discussed and may be considered for the sake of simplicity also as the OSS server in the following examples.

In FIG. 1, a Resource Management Device (RMD) 145 is connected to the BSC 144 to determine the load of the network node 144. However, it should be understood that the RMD 145 could also be part of the BSC 144 or could as well be connected or integrated in a different network node to determine the load of the different network node.

It is noted that some of the recordings of radio measurements of different networks can be run in parallel. There are even radio measurements of which multiple instances can be run in the same network node, e.g. WCDMA Radio Environment Statistics (RES). However, there are some recording types for which only one instance can be run at the same time in a cell, such as GSM BCCH Frequency Allocation Recordings (BAR) which is one recording type.

Details regarding the network support apparatus 120 and the RMD 145 are described with respect to FIGS. 2 and 3 in the following.

Figure 2:
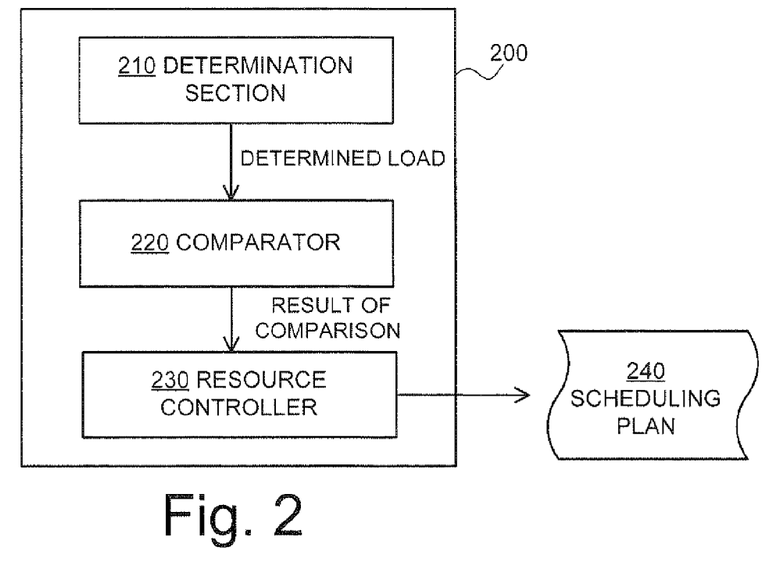
FIG. 2 illustrates elements of an apparatus for supporting the operation of a radio communication network according to an embodiment of the invention.

FIG. 2 illustrates the elements of an apparatus 200 which is an example of the network support apparatus 120 of FIG. 1. The apparatus 200 may be connected to the OSS or, as shown in FIG. 1, may be integrated in the OSS, particularly in the OSS server. For example, the functions of the apparatus 200 could be run on the processor of the OSS server. The apparatus 200 supports the operations of one or a plurality radio communication networks, such as the networks with the reference signs 140, 150 and 160 in FIG. 1.

As shown in FIG. 2, the apparatus 200 comprises a determination section 210 or determiner 210, a comparator 220 and a resource controller 230. The determination section 210, the comparator 220 and the resource controller 230 are connected suitably, preferably internally, to transfer data as indicated in FIG. 2. Further, the apparatus 200 may comprise some kind of controller, not shown, to control the operations of the elements 210, 220 and 230. For example, the function of the resource controller 230 may be a function of this controller and it is also feasible to implement the functions of the comparator 220 and the determination section 210 on this controller.

In more detail, the determination section 210 determines a load at the apparatus 200 based on the number of events generated by recordings activated by at least one PM function in a time period. Load may be regarded as a measure of the amount of work that a processor of the herein described apparatus, device, node or system performs in a certain time period, but may here also be regarded as a measure of the amount of (temporary) storage occupied in the apparatus, device, node or system. Examples of different loads are the load on the CPU of the OSS, memory load or disc space load which will be explained in more detail below.

It should be understood that as a determination section, any suitable unit may be used that obtains the number of events generated by one or multiple recordings of radio measurements triggered by a PM function in a time period and determines the load using this information. The events including information on a certain measurement are collected by the OSS in a time period, such as a result output period which may commonly be 15 minutes or another smaller or larger time period, such as 1 minute, 1 hour or even a day. According to the number of events per time the load can be estimated, namely the higher the number of events the higher the load, i.e. the more processor resources are occupied.

The determined load is then provided to the comparator 220 which compares the determined load with a threshold load smaller than or equal to the maximum load supported by the apparatus.

For example, the threshold load is set to somewhere between 50-80%, e.g. 70%, of the maximum capacity of the OSS, such as the capacity of the processor, memory or disc space. Thereby, there is a high enough safety margin for any fluctuations, or the threshold load is determined by a model, and differences between the model and reality are taken into account.

According to the result obtained by the comparator 220, i.e. whether the determined load is below or above the threshold load, e.g. 70%, a certain resource management procedure is performed by the apparatus 200. For example, if the determined load is above the threshold load, scheduled recordings associated with certain PM functions which are to be carried out shortly, can be rescheduled to avoid overload of the apparatus or OSS. The rescheduling may be performed by the resource controller 230 accessing a scheduling plan 240 to move a scheduled recording to a different time.

In a general case, the determination section 210 and the comparator 220 may be constituted by one or two processing means with appropriate interfaces to carry out the above described functions by software and/or hardware. These functions may be changed or extended by a software update or hardware configuration. The functions of the processing means may be realized by a microprocessor, a computer, a field programmable gate array (FPGA) or integrated circuit, such as an ASIC (Application Specific Integrated Circuit) but are not limited thereto.

In detail, the load determination function of the determination section may be modified according to the load of interest, such as the processor load, disc space load and memory load which are all associated with different predetermined parameters.

For example, the processor load, i.e. the load on the CPU, can be determined by the following equation:

$$L^{op} = \text{Sum}_r (P^{op}_r \cdot N_r) \tag{1},$$

wherein $N_r$ is the number of events generated by the recordings belonging to recording type r in a time period, such as ROP. $P^{op}_r$ is the required processor load per event in the above time period generated by one or more recordings of recording type r. The parameter $P^{op}_r$ is a predetermined parameter and can be considered as an equivalent processor load that is predetermined in the laboratory by measurement or by model simulation. The number of events $N_r$ is a function of traffic, i.e. the number of the simultaneously active users and the transmitting bit rate. Here, traffic may be understood as both the number of users and the generated traffic. The number of generated events may thus be a function of both the number of the simultaneously active users and the generated traffic load by these users.

Another kind of load which may be considered in an OSS is the disc space load of the hard disc of the OSS which can be determined as follows:

$$L^{od} = N^{ROP} \cdot \text{Sum}_r (S^{od}_r \cdot N_r) \tag{2},$$

wherein $N_r$ has been described above and $S^{od}_r$ is the disc space occupied by an event generated by a recording of recording type r. This parameter can be considered as an equivalent disc space load and is predetermined in the laboratory by measurement in advance or by model simulation.

$N^{ROP}$ is the number of stored ROPs, e.g. in the file retention period. For example, if one ROP is 15 minutes, 96 ROPs can be generated in one day so that it is clear that the more events are generated, the higher the load on the disc space. The event files may then be removed from the server after the retention period so they do not occupy disk space after this period.

Another kind of load is the memory load of the OSS which may be similarly determined as follows:

$$L^{om} = F^{om} \cdot \text{Sum}_r(S^{om}_r \cdot N_r) \quad (3).$$

In equation (3) $F^{om}$ is the fraction of the ROP file (the file recorded within one ROP) read into the memory during processing in the ROP. $N_r$ has been explained above and $S^{om}_r$ is a predetermined parameter constituting the memory occupied by one event generated by a recording of recording type r in the memory. This parameter can be considered as an equivalent memory load and is determined in advance in the laboratory or by model simulations.

It is noted that there are events in the ROP files that are not generated by periodic recording functions, the number of these events is negligible compared to the ones generated by the periodic recording functions, thus they are negligible in the above equations.

Before turning to the resource management device 300 of FIG. 3 which comprises similar elements as the apparatus 200 of FIG. 2, the operations of the apparatus 200 will be described in more detail with regard to FIG. 4 and FIG. 6.

Figure 4:
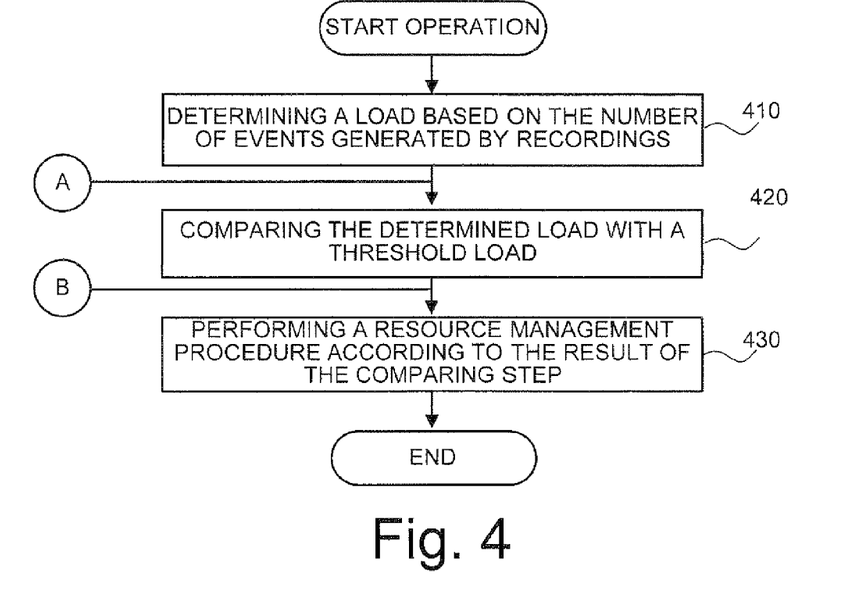
FIG. 4 illustrates operations of a method for managing resources of a network support apparatus according to an embodiment of the invention.

FIG. 4 illustrates a flow diagram of operations, also referred to as steps herein, of a method for managing resources of a network support apparatus, such as apparatus 200. In particular, the method is carried out by the network support apparatus during operation.

In a first operation 410, when starting operations, the load is determined based on a number of events generated by recordings activated by at least one performance management function in a time period, such as an ROP. As described above, the load is caused by received events and counters, for example, wherein counters may be negligible.

In operation 420, the load determined in operation 410 is compared with a threshold load smaller than or equal to the maximum load supported by the network support apparatus, such as apparatus 200 or the OSS server.

Then, in operation 430 a resource management procedure is performed according to the result of the comparing step. A resource management procedure is, for example, the scheduling of the execution of a PM function for data measurement, which will be described in more detail below.

Since only limited resources, such as processing power, hard disc space and RAM is available in an OSS server, it is important to optimally schedule recordings leading to events at the OSS by monitoring and predicting the load to avoid overload.

Figure 6:
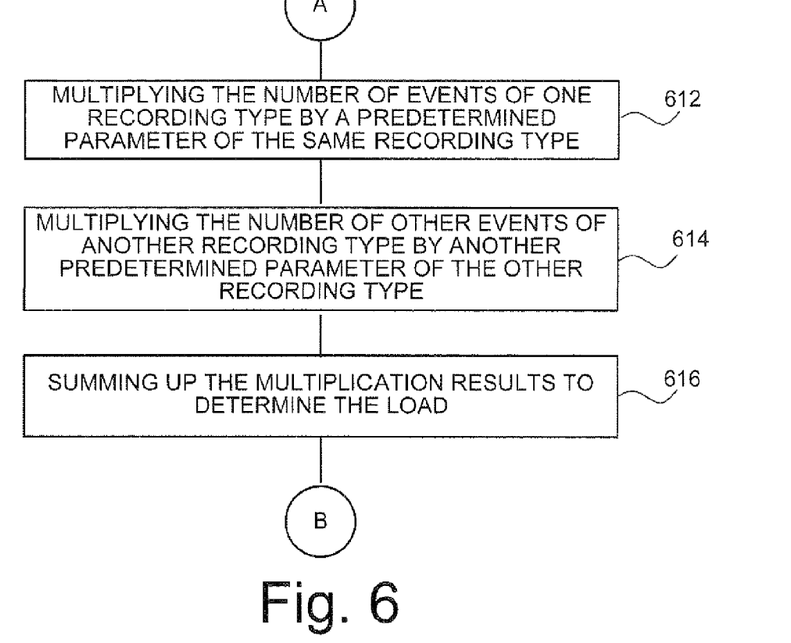
FIG. 6 illustrates operations of a modification of the method shown in FIG. 4.

In FIG. 6 the determining step of FIG. 4 is modified, namely it is defined in operation 612 that for the load determination the number of events of one recording type is multiplied by a predetermined parameter associated with the same recording type.

The above equations (1) to (3) show three examples of predetermined parameters. For example, $P^{op}_r$ is a predetermined parameter to calculate the processor load. In the other examples, $S^{od}_r$ and $S^{om}_r$ are predetermined parameters to calculate the disc space load and memory load, respectively. In all equations (1) to (3) the number of events of the recording type r is multiplied by the predetermined parameter associated with the same recording type r to achieve good estimation of the load.

The optional operations 614 and 616 of FIG. 6 are useful if events generated by recordings of more than one recording type are present in the time period. In this case, the number of events of the second recording type is multiplied by a second predetermined parameter of the second recording type. As before, the second predetermined parameter may be again the equivalent processor load but this time per event generated by the recording of the second recording type, which is usually a different predetermined parameter than for the first recording type. Also this second predetermined parameter can be measured in the laboratory or by model simulations and the recordings of the second recording type are usually activated by another PM function, i.e. a second PM function.

As indicated in operation 616, the multiplication results of the multiplications of the different recording types, such as the first and second recording types in this example, are summed up.

Examples of two recordings of two different recording types that influence the processor load at the OSS are e.g. periodic radio environment statistics measurements and relative time difference measurements of the received radio frames in WCDMA networks. The periodic signal strength measurements relate to the periodic radio environment statistics (RES) recording type and the other recording relates to another recording type, namely time difference measurements recording type.

Accordingly, a good estimation of the load is achieved, such as a good estimation of the processor load with equation (1), of the memory load with equation (3) or of the disc space load with equation (2).

Hereby, it is noted that the equations (1) to (3) give generally very good estimations of the load but a good estimation is already obtained by simply considering the individual dependencies of the equations, in particular the number of events $N_r$.

In the following, the resource management device 300 of FIG. 3 will be described in more detail.

Figure 3:
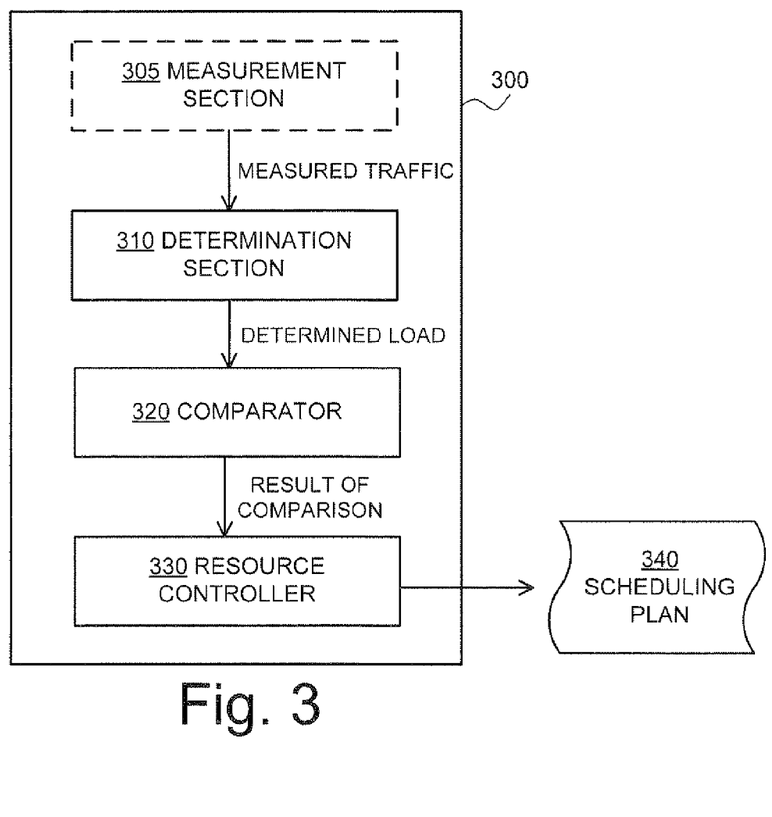
FIG. 3 illustrates elements of a resource management device according to an embodiment of the invention.

As shown in FIG. 3, the resource management device 300, which is an example of the RMD 145 of FIG. 1, comprises a determination section 310, a comparator 320 and a resource controller 330 with similar functions to the similar elements of the apparatus 200 of FIG. 2. Optionally, shown by a dashed box, the RMD 300 may also comprise a measurement section 305. The RMD 300 may be integrated or connected to any network node of interest, such as the BSC 144 as shown in FIG. 1. For example, the functions of the RMD 300 could be run on the processor of the BSC 144 or the RNC of FIG. 1.

The RMD 300 manages the resources of a network node of a radio communication network and, similar to the apparatus 200, determines and analyzes a load to perform a resource management procedure to enable smooth operation of the network, e.g. to balance the load of the network. The determination section 310, comparator 320 and resource controller 330 are connected suitably, preferably internally, to transfer data as indicated in FIG. 3. The RMD 300 may also comprise some kind of controller, not shown, to control operations of the elements 310, 320, 330 and optionally 305 or to execute the functions of these elements.

In more detail, similar to the determination section 210, the determination section 310 determines a load of the network node, such as the BSC 144, based on traffic at the network node and a predetermined parameter associated with a network node type and a recording type of a recording preferably activated by a performance management function.

As discussed above, load may be regarded as a measure of the amount of work that a processor of a node, such as a BS or BSC, performs in a certain time period. The traffic may be packet-switched and/or circuit-switched traffic, and in particular the traffic may depend on the number of simultaneously active users and/or a transmitting bit rate at the node. To determine the load at a certain time of day, one may refer to previously obtained traffic, such as a reference traffic common for the certain time of day which is stored in traffic profiles. Alternatively, if the current traffic at the node is to be considered, the current traffic may be measured by the measurement section 305 and then provided to the determination section 310.

Similar to the previously discussed predetermined parameters, a predetermined parameter for load determination in the RMD 300 is also associated with a recording type of a recording. Further, this predetermined parameter is associated with a network node type, e.g. BS in GSM, node B in UMTS, e-node B in LTE, BSC or RNC to name a few node types. Similar to the previously described predetermined parameters in equations (1) to (3) also this predetermined parameter may be obtained in the laboratory through measurements or by model simulation and can be considered as an equivalent load.

The determined load is then provided to the comparator 320 which compares the load with a threshold load smaller than or equal to the maximum load supported by the network node. As described above, the threshold node may be set to somewhere between 50-80% of the maximum capacity of the node to provide a high enough safety margin for any fluctuations.

The result of the comparison 320 is then used by the RMD 300 to perform a resource management procedure. As described above, the resource management procedure may be rescheduling of one or more recordings to avoid an overload of the node and may be carried out by the resource controller 330 accessing a scheduling plan 340 to move one or more scheduled recordings to a different time. On the other hand, when the load is below the threshold load, the scheduled recordings may be kept. The scheduling plan will be described below in more detail with respect to FIG. 8 below.

It is noted that the elements of the RMD 300 are basically the same as the elements of the apparatus 200 merely that the determination section 320 determines the load of a node based on different input, namely traffic instead of number of events, even so the number of events largely depends on the traffic. Accordingly, the apparatus 200 and the RMD 300 are interrelated entities one for determining the load at the OSS and the other to determine the load at a network node connected and communicating with the OSS. Therefore, for more details of the RMD 300 and its elements, it is referred to the detailed description of the apparatus 200 to avoid unnecessary repetition.

A specific example of how to determine the load of a node, in particular the total load of the node n, is described with respect to the following equation:

$$L^n = c^n \cdot \text{Sum}_{ij,r}(L^{nr}_{Ui} \cdot U^n_i + L^{nr}_{Tj} \cdot T^n_j) \quad (4)$$

In equation (4) the equivalent load component generated by one active user is denoted by $L^{nr}_{Ui}$ and the equivalent load component generated per kbit/s is denoted by $L^{nr}_{Tj}$, which constitute a first predetermined parameter for active user traffic and a second predetermined parameter for bit rate traffic, respectively. The number of simultaneously active users, $U^n_i$ is expressed in Erlang, while the transmitting bit rate is measured in kbit/s and denoted by $T^n_j$. The equivalent load components are determined close to capacity maximum of the nodes using a realistic traffic model, for example.

In equation (4) $c^n$ is the number of cells belonging to the node n. For example n equals 3 for a base station with three sectors and n equals 1,000 for a control node supporting 1,000 cells. Therefore, it is clearly understandable that the total load of the node increases proportionally to the number of sectors or cells, respectively.

In the following, the operations for managing resources of a network node of a radio communication network are described in detail with respect to FIGS. 5 and 7.

Figure 5:
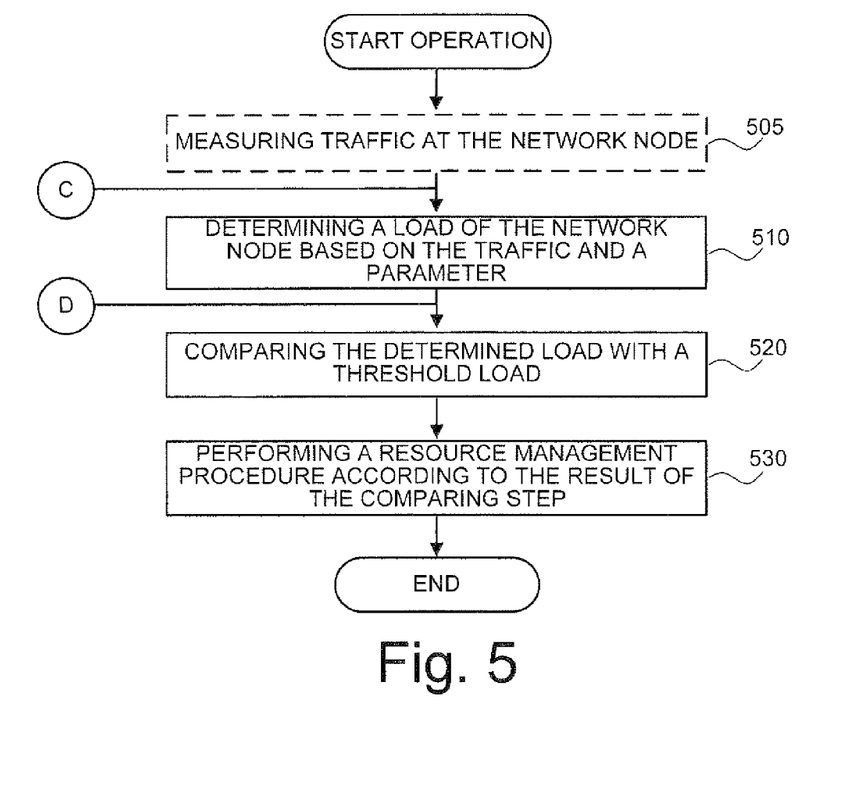
FIG. 5 illustrates operations of a method for managing resources of a network node of a radio communication network according to an embodiment of the invention.

FIG. 5 illustrates a flow diagram of operations, also referred as steps, of a method for managing resources of a network node, which may be carried out by the RMD 300 of FIG. 3.

In a first optional operation 505, traffic at the network node is measured, wherein this traffic can be active user traffic measured in Erlang basically corresponding to the simultaneously active number of users for and the generated bit rate measured in kbit/s. Simultaneously active users may include the packet-switched users as well and kbit/s may include traffic generated by circuit-switched users as well but may be much less than the traffic of packet-switched users.

In the operation 510, the load of the network node is determined based on the traffic and a predetermined parameter. As described above, the traffic may be traffic obtained from a daily traffic profile or may be the traffic measured just before the operation 510 such as in operation 505. Here, the predetermined parameter is at least one of the first and second predetermined parameters described above with respect to equation (4) and is associated with the network node type and a recording type of a recording. The recording is usually activated by a performance management function, the above described PM function, which may trigger one or more recording functions in the nodes for measuring data. However, the recording functions may also be directly triggered by a node.

In operation 520, the load determined in operation 510 is compared with a threshold load smaller than or equal to the maximum load supported by the network node. According to the result of the comparing operation 520, a resource management procedure is performed in operation 530, examples of which have been described above and further examples will be given below.

Figure 7:
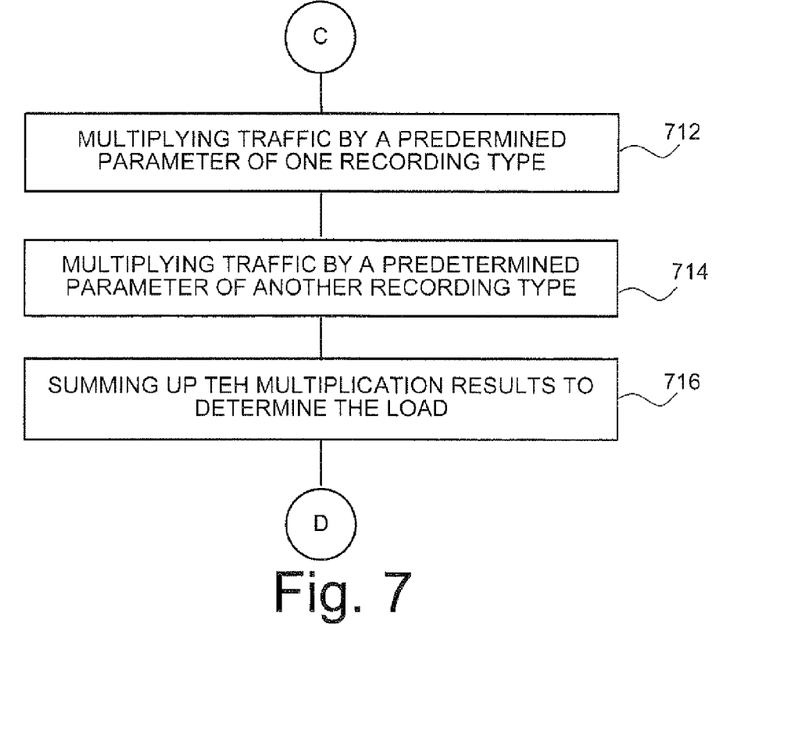
FIG. 7 illustrates operations of a modification of the method shown in FIG. 5.

In FIG. 7 the determining step of FIG. 5 is modified, namely it is defined in operation 712 that for the load determination traffic is multiplied by the predetermined parameter of one recording type. As discussed above, the traffic may be measured traffic or may be taken from a traffic profile.

The optional operations 714 and 716 of FIG. 7 are useful if different recordings of different recording types (see subscript r in equation (4)) are present. In this case, as indicated in operation 714, traffic is multiplied by a different predetermined parameter of another recording type and the multiplication results are summed up, as shown in equation (4) and operation 716, to determine the total load of the node.

As indicated above, part of the node load is related to the number of simultaneously active users, while another part of the load is related to the transmitted traffic. As shown in equation (4) the predetermined parameter comprises a first predetermined parameter for active user traffic and a second predetermined parameter for bit rate traffic and the active user traffic is multiplied by the first predetermined parameter and the bit rate traffic is multiplied by the second predetermined parameter and the multiplication results are added.

Mathematically this can be expressed as follows. The bit rate traffic and the active user traffic form a traffic vector and the first predetermined parameter and the second predetermined parameter form a parameter vector, and the traffic vector and the parameter vector are multiplied to obtain a scalar product of the vectors for one specific recording type.

If more recording types should be present, the scalar products of the different recording types are added up.

In the following, the scheduling of recordings will be described under consideration of the determined load. In particular, the above described example of scheduling or rescheduling the execution of a PM function for data measurement according to the result of a threshold load comparison as a resource management procedure is described.

First, a scheduler has to consider the limits of the network nodes and the OSS, such as a maximum number of cells as well as the disc capacity, processor load and memory load on the OSS side, etc. All this should be taken into account for each RNO function (application). At no time in operation the limits of the system should be exceeded. The limits are available from test measurements at the device, apparatus or system during a product verification process and usually refer to specific conditions, e.g. when only one application is running on the OSS server and a fixed reference traffic mix is assumed.

To determine the load of the nodes and the OSS server, daily traffic profiles can be used. In practice, two kinds of daily profiles are commonly used, one for working days and another one for weekends. Each profile provides different traffic amounts depending on the time of day and can be determined in advance by measurements or simulations and serve as input for the scheduler which may be a part of the OSS system. Further, the scheduled recordings generate traffic and events which are taken into account to determine the load of a network node and the OSS server, respectively.

Figure 8:
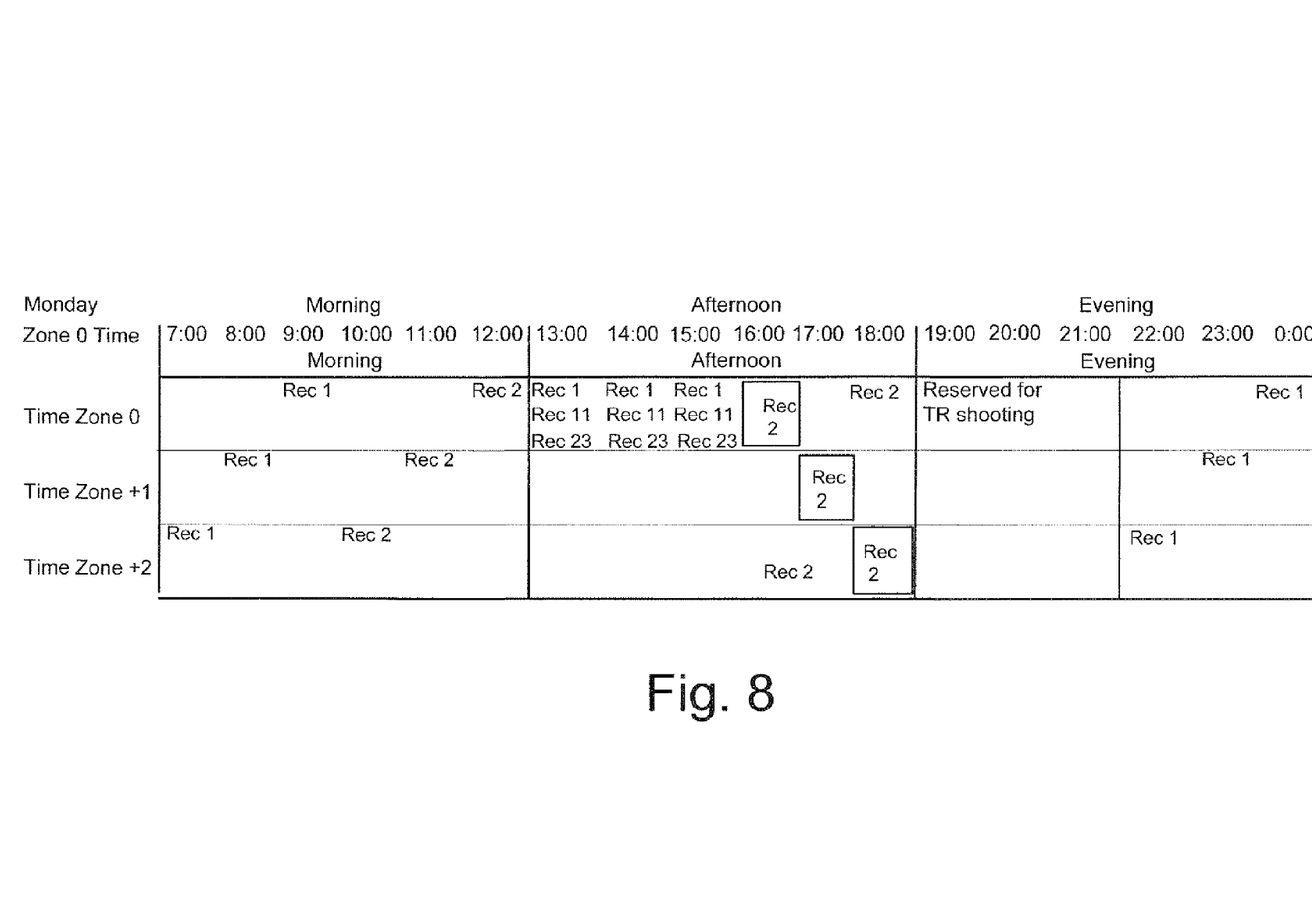
FIG. 8 illustrates an example showing the scheduling of different recordings.

A scheduling plan with scheduled recordings is shown in FIG. 8. PM functions are classified by the recording types they use and often only one recording can be run for each recording type at a time in the same cell set. The cell set is selected by the PM function (application) running on the OSS, for example, wherein these limitations should be taken into account automatically in the scheduling plan.

When a recording is added to the scheduling plan, the scheduler, which may be part of the OSS system or any other centralized management system, as described above, determines the load in the network nodes affected by the added recording, based on equation (4). Hereby, the traffic values for equation (4) are obtained from daily traffic profiles or measurements and the load can be determined.

Based on a traffic profile, also the number of expected events per recording type in a ROP can be calculated, which was designated as $N_r$ before. Accordingly, also the processor load, disc space load and memory load in the OSS server may be determined based on equations (1), (2) and (3). Then the determined load values are compared with threshold values, such as a certain percentage of maximum capacity or even 100% of maximum capacity and it is indicated if a capacity limit is exceeded. Further, also the estimated required capacity and an available free capacity can be compared.

In order to run a recording for an optimum time period the scheduler may determine the minimum number of required ROPs for each function at different time periods. The number of required ROPs can be calculated based on traffic load and sampling frequency of a recording function. For example, it is assumed that 10,000 events are needed for adequate statistics for a function. If one active user generates 100 events per minute and traffic is 5 Erlang in a cell, then only 7,500 events are generated for a 15 minute ROP. Accordingly, the function should be run at least for 2 ROPs. Alternatively, a default number of ROPs is used for each function (application), determined by engineering guidelines and previous experience.

According to the above, when scheduling the execution of a PM function, the load of a network node may be determined based on traffic obtained from a traffic profile. Furthermore, when the execution of a PM function is scheduled by the OSS, the load of the OSS may be determined by determining the number of events in a time period from traffic of a traffic profile or measured traffic.

In detail, the scheduling can be performed in the following way to manage the resources of the nodes and OSS. As seen in FIG. 8, working days and weekends are distinguished. Further, each day may be divided into four different time periods with different user behaviours, i.e. the traffic load and/or traffic mix is different, such as in the morning, afternoon, evening and at night. Generally, three to five recordings are needed for each function in each of the four time periods.

In the example of FIG. 8, the time periods are defined as follows, morning from 7:00 to 13:00, afternoon from 13:00 to 19:00, evening from 19:00 to 1:00 and night for the other hours. As can be seen in FIG. 8, the recordings Rec 1 in the morning are scheduled in a way that the recordings of different time zones do not overlap in time, i.e. in each time zone the recording Rec 1 is carried out at 9:00 local time. The same is true for the recordings Rec 2 in the morning and recordings Rec 1 in the evening. The main goal of this scheduling strategy is
  1. to obtain the same measurement type in the same local time, in this way different zones can directly be compared and the measurements done in different time zones can be unified in one report that is covering more time zones, and/or
  2. to balance the load of the OSS.

Certain time slots may be reserved for manual trouble shooting in a certain time period, here e.g. 19:00 to 22:00 in the evening. At these times of the day recordings may not be scheduled, as shown in FIG. 8.

Specific automating planning or trouble-shooting functions should be performed on relatively small cell sets. Here the bottleneck for running many functions (applications) in parallel is the type of recording. Therefore, one recording is run from each type, as shown in the time between 13:00 and 16:00, where Rec 1, Rec 11 and Rec 23 use different recordings so that they can be run in parallel. Further, recording Rec 2 at 16:00 and 18:00 in zone 0 time is run both for time zone 0 and time zone +2. Here, when a recording is carried out in a time zone, another recording can be carried out in another time zone because
  1. the parallel recordings are done in non-overlapping cell sets
  2. the generated relatively low event loads do not overload the OSS.

However, the parallel recordings are done for as far time zones as possible in order to avoid many recordings in busy hours and to balance the OSS load.

Monitoring functions that should be run continuously for the whole network may be distributed in the remaining time periods. Since the number of cells for which a recording is done is limited, the full network can be covered usually only with more than one recording. The cell sets of different recordings are preferably organized in consecutive time zones. In this way the consecutive recordings will be done for the same local time, as shown in FIG. 8 in the morning hours, and the results may be combined in a common report.

As can be seen above, a recording, i.e. execution of a PM function triggering the recording, may be scheduled according to the time of day or/and the day in the week to balance the load. Hence, it is important to provide schemes to determine the load that the suitable resource management procedure is carried out, i.e. future recordings are moved to a different time slot, are deleted or maintained.

According to the above, the load can be balanced in the available time period so that, for example, in busy hours parallel recordings are carried out in far time zones where load is lower. The OSS load and if possible the whole network load can be determined for each time period. Further, if the load is not evenly distributed, it can be checked by using the scheduling plan and the above described equations whether the load can be balanced by amending the schedule. Additionally, the determined load may be displayed as a function of time.

According to the above, it is also possible during the operation, e.g. after recordings are started, to monitor processor load and memory load of the OSS as well as the load of the nodes and compare the load with threshold loads during planning of the scheduling plan so that an estimated performance can be verified. The results of the recordings as well as the network load, e.g. the load of several network nodes, and OSS load during the recordings are compared and reported. A notification or alarm can be sent in case of high load situations.

It has been shown that load generated by PM functions can be determined for each network node. Further, processor load, disc space load and memory load of the OSS generated by PM functions can also be determined. The load of the OSS is basically determined as a function of the processed events which is much more exact than prior art methods, which used purely the maximum number of cells for each recording type as constrain at scheduling, or any provisioning methods based on system test measurements at fixed network and traffic conditions. Accordingly, this method allows more recordings in the same time than previous methods and, in the same time, overloading of both network nodes and OSS can be prevented.

As an example, according to the above, operators can use PM functions in an optimal way since the above teaching allows functions to be used close to the flexible limits allowed by the actual network traffic load.

Furthermore, a consistent scheduling plan for recordings can be generated automatically for all required PM functions, in particular RNO functions. To optimize the scheduling plan, PM functions can be segmented along the latitude to balance the load, and not along the longitude as in the prior art which would lead to a combination of nodes of the same time zone and thus with the same busy hours. Further, recordings for different periods of the day and week can be scheduled, in order to check radio parameters at different traffic loads.

Still further, scheduling may take into account that enough statistics is taken for each PM function so as to avoid that PM functions are run unnecessarily and avoid the need to repeat this measurement.

The physical entities according to the different embodiments of the invention, including the elements, sections, devices, apparatuses and systems may comprise or store computer programs including instructions such that, when the computer programs are executed on the physical entities, steps and operations according to embodiments of the invention are carried out, i.e. cause data processing means to carry out the operations. In particular, embodiments of the invention also relate to computer programs for carrying out the operations according to the embodiments of the invention, and to any computer-readable medium storing the computer programs for carrying out the above mentioned methods.

Where the terms determination section, comparator, resource controller and measurement section are used, no restriction is made regarding how distributed these elements may be and regarding how gathered elements may be. This is, the constituent elements of the apparatuses and resource management devices may be distributed in different software or hardware components or devices for bringing about the intended function. A plurality of distinct elements may also be gathered for providing the intended functionalities.

As discussed above, the elements of the apparatuses or devices may also be implemented in hardware, software, field-programmable gate array (FPGA), application specific integrated circuit (ASIC), firmware or the like.

It will be apparent to those skilled in the art that various modifications and variations can be made in the entities, apparatuses and devices as well as methods of this invention as well as in the construction of this invention without departing from the scope or spirit of the invention.

The invention has been described in relation to particular embodiments and the examples which are intended in all aspects to be illustrative rather than restrictive. Those skilled in the art will appreciate that many different combinations of hardware, software and firmware will be suitable for practising the present invention.

Moreover, other implementations of the invention will be apparent to those skilled in the art from consideration of the specification and practise of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A method for managing resources of a network support apparatus of a radio communication network, the method implemented by the network support apparatus, the method comprising:
   determining a load at the network support apparatus based on a number of events, in a time period, generated by recordings activated by at least one performance management function which triggers a radio measurement;
   comparing the determined load with a threshold load smaller than or equal to a maximum load supported by the network support apparatus;
   scheduling execution of a performance management function for data measurement based on the result of the comparing as a resource management procedure to avoid overload of the network support apparatus;
   wherein the determining comprises multiplying the number of events of one recording type by a predetermined parameter associated with the one recording type.

2. The method of claim 1, wherein the determining comprises:
   multiplying the number of other events of another recording type by another predetermined parameter associated with the other recording type;
   summing results of the multiplications of the one and the other recording types.

3. The method of claim 1, wherein the determined load constitutes an estimation of at least one of a processor load, memory load, and disc space load of the network support apparatus.

4. The method of claim 3; wherein the predetermined parameter is different for each of the processor load, the memory load, or the disc space load.

5. The method of claim 1, further comprising scheduling execution of a performance management function for data measurement based on at least one of a time of day and a day in a week.

6. The method of claim 1:
further comprising scheduling execution of a performance management function;
wherein the load of the network support apparatus is determined by determining the number of events in a time period from traffic of a traffic profile.

7. A method for managing resources of a network node of a radio communication network, the method, implemented by the network node, comprising:
measuring traffic at the network node;
determining a load of the network node based on the traffic at the network node and a predetermined parameter, the predetermined parameter associated with the network node type and one recording type of a recording activated by a performance management function;
comparing the determined load with a threshold load smaller than or equal to a maximum load supported by the network node;
scheduling execution of a performance management function for data measurement based on the result of the comparing as a resource management procedure to avoid overload of the network support apparatus;
wherein the determining comprises multiplying the traffic by the predetermined parameter.

8. The method of claim 7, wherein the determining comprises:
multiplying the traffic by a predetermined parameter of another recording type;
summing results of the multiplications of the one and the other recording types.

9. The method of claim 7, wherein:
the traffic comprises bit rate traffic related to the bit rate at the network node and active user traffic related to the number of active users at the network node;
the predetermined parameter comprises a first predetermined parameter for active user traffic and a second predetermined parameter for bit rate traffic.

10. The method of claim 9:
wherein the bit rate traffic and the active user traffic form a traffic vector;
wherein the first predetermined parameter for active user traffic and the second predetermined parameter for bit rate traffic form a parameter vector;
wherein the traffic and parameter vectors are multiplied to obtain a scalar product of the vectors.

11. The method of claim 7, wherein the load is proportional to the number of sectors or cells serviced by the network node.

12. The method of claim 7, further comprising scheduling execution of a performance management function for data measurement based on at least one of a time of day and a day in a week.

13. The method of claim 7:
further comprising scheduling execution of a performance management function;
wherein the load of the network node is determined based on traffic obtained from a traffic profile.

14. An apparatus for supporting the operation of a radio communication network, the apparatus comprising:
one or more processing circuits configured to function as:
a determination section configured to determine a load at the apparatus based on a number of events, in a time period, generated by recordings activated by at least one performance management function which triggers a radio measurement;
a comparator configured to compare the determined load with a threshold load smaller than or equal to a maximum load supported by the apparatus;
wherein the load determination comprises multiplying the number of events of one recording type by a predetermined parameter associated with the recording type;
wherein the apparatus is configured to schedule execution of a performance management function for data measurement based on the result of the comparing as a resource management procedure to avoid overload of the apparatus.

15. A resource management device of a network node of a radio communication network, comprising:
one or more processing circuits configured to function as:
a measurement section configured to measure traffic at the network node;
a determination section configured to determine a load of the network node based on the traffic at the network node and a predetermined parameter, the predetermined parameter associated with the network node type and a recording type of a recording activated by a performance management function;
a comparator configured to compare the determined load with a threshold load smaller than or equal to a maximum load supported by the network node;
wherein the load determination comprises multiplying the traffic by the predetermined parameter;
wherein the resource management device is configured to schedule execution of a performance management function for data measurement based on the result of the comparing as a resource management procedure to avoid overload of the network node.

16. A computer program product stored in a non-transitory computer readable medium for managing resources of the network support apparatus of a radio communication network, the computer program product comprising software instructions which, when run on one or more processing circuits of the network support apparatus, causes the network support apparatus to:
determine a load at the network support apparatus based on a number of events, in a time period, generated by recordings activated by at least one performance management function which triggers a radio measurement;
compare the determined load with a threshold load smaller than or equal to a maximum load supported by the network support apparatus;
schedule execution of a performance management function for data measurement based on the result of the comparing as a resource management procedure to avoid overload of the network support apparatus;
wherein the network support apparatus determines the load by multiplying the number of events of one recording type by a predetermined parameter associated with the recording type.

17. A computer program product stored in a non-transitory computer readable medium for managing resources of a network node of a radio communication network, the computer program product comprising software instructions which, when run on one or more processing circuits of the network node, causes the network node to:
measure traffic at the network node;
determine a load of the network node based on the traffic at the network node and a predetermined parameter, the predetermined parameter associated with the network node type and a recording type of a recording activated by a performance management function;
compare the determined load with a threshold load smaller than or equal to a maximum load supported by the network node;

schedule execution of a performance management function for data measurement based on the result of the comparing as a resource management procedure to avoid overload of the network node;
wherein the network node determines the load by multiplying the traffic by the predetermined parameter.

18. The method of claim 1, wherein said network support apparatus is connected to a plurality of radio access networks with different radio access technologies.

19. The method of claim 7, said network node type indicating the radio access technology used by the network node.

20. The method of claim 1, wherein scheduling execution of a performance management function for data measurement comprises scheduling execution of measurement of at least one of:
   one or more radio parameters of a channel frequency,
   one or more radio parameters of a frequency spectra,
   one or more radio parameters of a channel code, and
   one or more radio parameters of a code range.

21. The method of claim 1, wherein the recording type is one of the following:
   Broadcast Control Channel (BCCH) Allocation Recording (BAR),
   Radio Interference Recording (RIR), and
   Radio Environment Statistics (RES).

22. The method of claim 1, wherein scheduling execution of a performance management function for data measurement comprises scheduling execution of a performance management function classified by a recording type used to record the data measurement.

23. The method of claim 7, wherein the network node is a base station or radio network controller.

* * * * *